United States Patent [19]

Bradley

[11] 4,168,397

[45] Sep. 18, 1979

[54] 8-PHASE PSK MODULATOR

[75] Inventor: Stevan D. Bradley, Palo Alto, Calif.

[73] Assignee: GTE Automatic Electric Laboratories Incorporated, Northlake, Ill.

[21] Appl. No.: 910,168

[22] Filed: May 26, 1978

[51] Int. Cl.$^2$ ............................................. H04L 27/24
[52] U.S. Cl. .................................... 178/67; 325/38 R; 332/16 R
[58] Field of Search ................. 178/67, 66; 325/38 R, 325/45, 47, 145; 332/16 R, 23 R

[56] References Cited

U.S. PATENT DOCUMENTS

| | | | |
|---|---|---|---|
| 3,845,412 | 10/1974 | Rearwin | 178/67 |
| 3,909,721 | 9/1975 | Bussgang | 178/67 |

OTHER PUBLICATIONS

Bennett and Davey "Data Transmission" pp. 202–203, McGraw-Hill.
"Modulating and Filtering for Three b/Hz Operation at 6 GHz" Wood, Communication News, Oct. 77, pp. 60–61.

Primary Examiner—Robert L. Griffin
Assistant Examiner—Michael A. Masinick
Attorney, Agent, or Firm—Russell A. Cannon

[57] ABSTRACT

This 8-phase modulator comprises logic circuitry for converting tribits XYZ of input data into binary control signals D1, D2, D3 and D4 according to a prescribed plan, a pair of 4-phase signal generators responsive to associated pairs of control signals, and a signal source producing a pair of equal amplitude carrier signals of the same frequency and of phases which differ by 45° for driving associated ones of the 4-phase generators 45° out-of-phase. Equal amplitude vector signals from the two 4-phase generators are combined to produce a resultant vector signal which individually generates the phasors of an 8-phase signal set.

11 Claims, 7 Drawing Figures

| X Y Z | D1 | S3/S3' φ | D2 | S4/S4' φ | S7 φ | D3 | S5/S5' φ | D4 | S6/S6' φ | S8 φ | S9 PHASE φR |
|---|---|---|---|---|---|---|---|---|---|---|---|
| 011 | 1 | 0° | 0 | -270° | -315° | 1 | -45° | 0 | -315° | 0° | -337.5° |
| 100 | 1 | 0° | 0 | -270° | -315° | 0 | -225° | 0 | -315° | -270° | -292.5° |
| 101 | 0 | -180° | 0 | -270° | -225° | 0 | -225° | 0 | -315° | -270° | -247.5° |
| 110 | 0 | -180° | 0 | -270° | -225° | 0 | -225° | 1 | -135° | -180° | -202.5° |
| 111 | 0 | -180° | 1 | -90° | -135° | 0 | -225° | 1 | -135° | -180° | -157.5° |
| 000 | 0 | -180° | 1 | -90° | -135° | 1 | -45° | 1 | -135° | -90° | -112.5° |
| 001 | 1 | 0° | 1 | -90° | -45° | 1 | -45° | 1 | -135° | -90° | -67.5° |
| 010 | 1 | 0° | 1 | -90° | -45° | 1 | -45° | 0 | -315° | 0° | -22.5° |

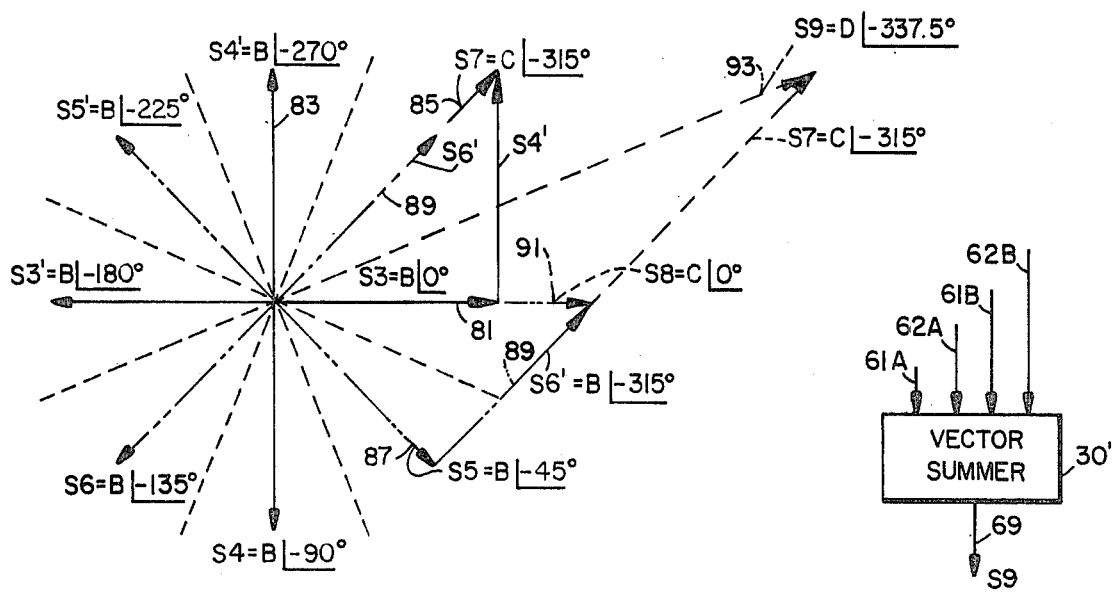
Fig. 3.
Fig. 7.
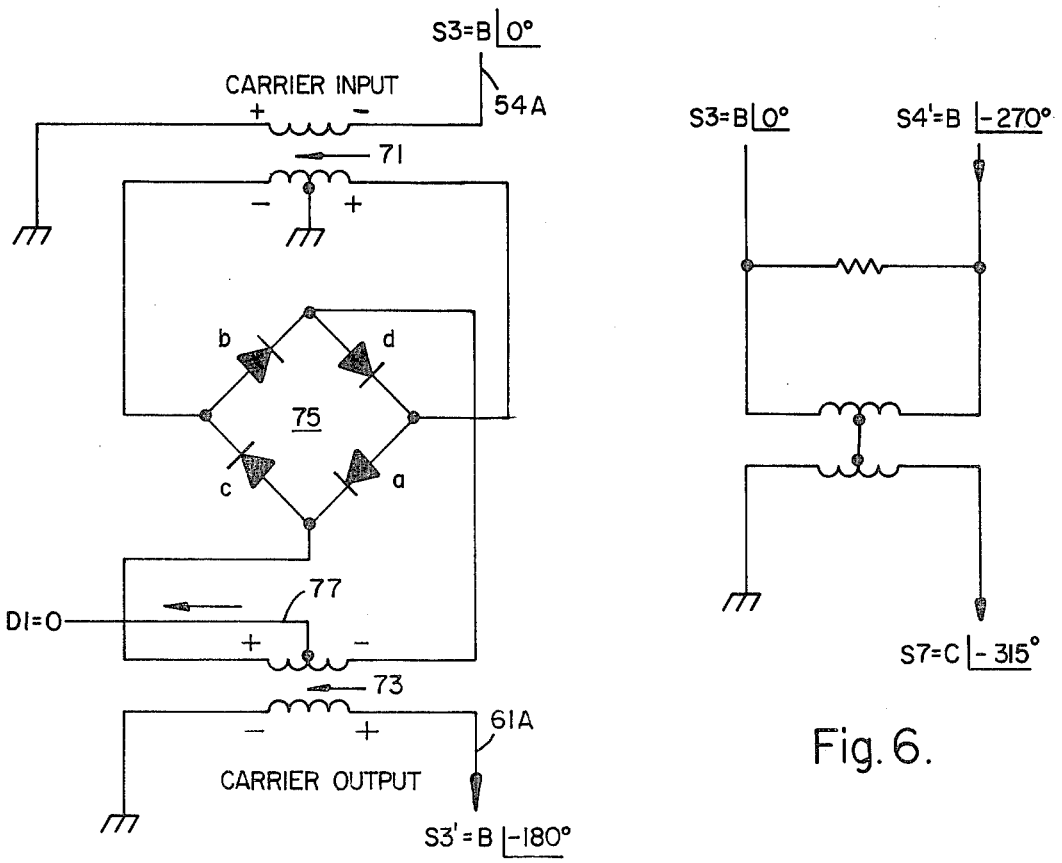
Fig. 5.
Fig. 6.

8-PHASE PSK MODULATOR

BACKGROUND OF INVENTION

This invention relates to polyphase modulation techniques in digital communication systems, and more particularly to method and apparatus for generating phase modulated carrier signals in data communication systems employing octal phase shift keyed (PSK) modulation.

In some phase modulated data systems, the phase of a carrier signal is periodically encoded according to digital words defined by groups of serial data bits. In such systems, a number of phasors or vector signals of the same frequency and amplitude and of different prescribed phases are required. A prior-art method of generating a 4-phase signal set is described at page 202, FIG. 10-1, of Data Transmission by W. R. Bennett and J. R. Davey, McGraw Hill Book Company, 1965. In this prior-art method, individual data bits of a pair thereof are applied to associated balanced mixers which are driven by quadrature phase carrier signals having phases of 0° and 90°, for example. The phase of the signal from one modulator is 0° and 180° for an input data bit of 1 and 0, respectively. The phase of the signal from the other modulator is +90° and −90° when the associated data bit is 1 and 0, respectively. The modulator output signals are of the same amplitude. The outputs of the modulators are combined to provide a 4-phase signal set with phasors at ±45° and ±135°. A modified form of this technique is described there for generating an 8-phase signal set. It requires a pair of control signals, each having 4 different DC levels, for driving associated modulators to produce output signals which are combined to produce a resultant vector signal selectively having phases which are odd multiples of 22.5°. It is difficult to consistently maintain the control signals at different prescribed DC levels so as to produce a set of 8 phasors with the same magnitudes and precise phases. The article "Modulating and Filtering For Three-b/Hz Operation At 6 GHz" by W. A. H. Wood, Ratheon Data Systems, at pgs. 60-61 of the October 1977 Communication News, describes a related technique of producing an 8-phase signal set. The technique in the article states that a carrier signal is split into orthogonal components and resistively divided to simultaneously form 8 equal amplitude vectors on separate output lines of the resistive divider. Vectors are then commutatively selected from associated output lines for transmission. Two such resistive-divider-commutator type generators are employed, with amplitude adjustment and phase adjustment in one of them, to generate a vector describing a $2^n$ point vector phase. This technique is relatively complex for generating phasors of an 8-phase signal set.

An object of this invention is the provision of improved method and apparatus for producing a signal vector that generates phasors of an 8-phase signal set.

SUMMARY OF INVENTION

In accordance with this invention, an apparatus for selectively individually producing phasors of an 8-phase signal set for use in a phase modulated digital communication system comprises first means producing a group of binary control signals D1, D2, D3, and D4 selectively having different prescribed combinations of logic values; second means producing a first carrier signal having a constant amplitude, a given frequency, and a prescribed constant reference phase; third means responsive to a first pair D1 and D2 of the control signals and to the first carrier signal for selectively producing a first pair of quadrature phase vector signals of the same amplitude and frequency and each selectively having a phase which may vary by 180° as a function of the logic value of an associated one of the signals D1 and D2, said first pair of vector signals together individually defining the phasors of a 4-phase signal set as the signals D1 and D2 assume different logic values; fourth means responsive to a second pair D3 and D4 of the control signals and to the first signal for selectively producing a second pair of quadrature phase vector signals of the same amplitude and frequency as the first pair of vector signals and each selectively having a phase which may vary by 180° as a function of the logic value of an associated one of the signals D3 and D4, said second pair of vector signals individually defining the phasors of a second 4-phase signal set which is shifted in phase by x45°, where x is odd, with respect to the first signal set as the signals D3 and D4 assume different logic values; and fifth means combining the first and second pairs of constant amplitude vector signals for producing a resultant vector signal which individually generates the phasors of the 8-phase signal set as phases of vector signals of the two pairs thereof assume different values.

DESCRIPTION OF DRAWINGS

This invention will be more fully understood from the following detailed description, together with the drawings in which:

FIG. 3 is a phasor diagram useful in explaining the operation of generator 10;

FIG. 5 is a schematic circuit diagram of the mixer 57A;

FIG. 6 is a schematic circuit diagram of the vector summer 65A; and

FIG. 7 is a schematic block diagram of the vector summer 30' which combines the functions of circuits 30, 65A and 65B.

DESCRIPTION OF PREFERRED EMBODIMENTS

Figure 1:
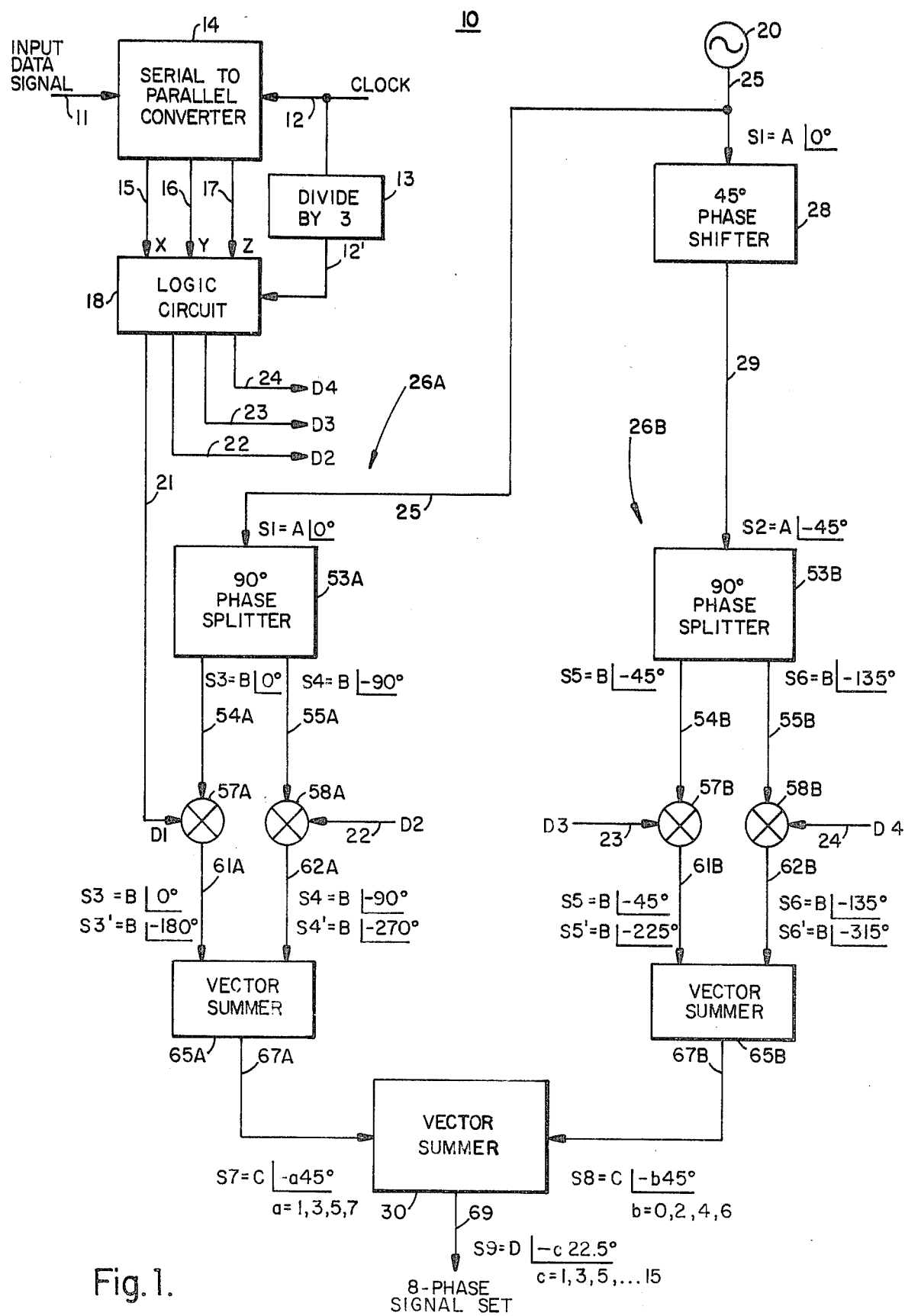
FIG. 1 is a schematic diagram of an 8-phase generator 10 embodying this invention.

Referring to FIG. 1, an 8-phase signal generator 10 embodying this invention comprises a serial-to-parallel convertor 14 and logic circuit 18 for converting groups of three serial input data bits on line 11 to four (4) binary control signals D1–D4, inclusive; a source 20 of a carrier signal S1; a pair of 4-phase signal generators 26A and 26B that are driven by associated pairs D1–D2 and D3–D4 of the binary control signals; a phase shifter 28 for causing the 4-phase generators to operate 45° out-of-phase; and a vector summer circuit 30. The converter 14 stores serial input data bits on line 11 and is responsive to clock pulses on line 12 from a source (not shown) for periodically outputting tribits or individual groups of three data bits XYZ on associated lines 15, 16 and 17. Logic circuit 18 is responsive to clock pulses for coding each tribit word XYZ into an associated unique group of four (4) binary control signals D1–D4 on lines 21–24 according to a prescribed plan such as the one specified in the tabulation in FIG. 2. Each of these control signals selectively has a value of either +5 volts or −5 volts, for example, which correspond to logic levels 1 and 0, respectively. The pairs D1–D2 and D3–D4 of binary control signals drive the associated 4-phase generators 26A and 26B for causing them to produce prescribed vector signals S7 and S8 which are combined in circuit 30 to produce a resultant vector S9 which individually generates phasors of an 8-phase signal set (see first column in FIG. 2). The vector S9 generates a different phasor of the 8-phase signal set along dashed lines in FIG. 3 for each unique tribit word XYZ and associated combination of values of the binary signals D1–D4. The manner in which the generators 26A and 26B and circuit 30 operate to perform these functions is described more fully hereinafter in relation to the tabulation in FIG. 2 and the phasor diagram in FIG. 3.

Figures 2, 4:
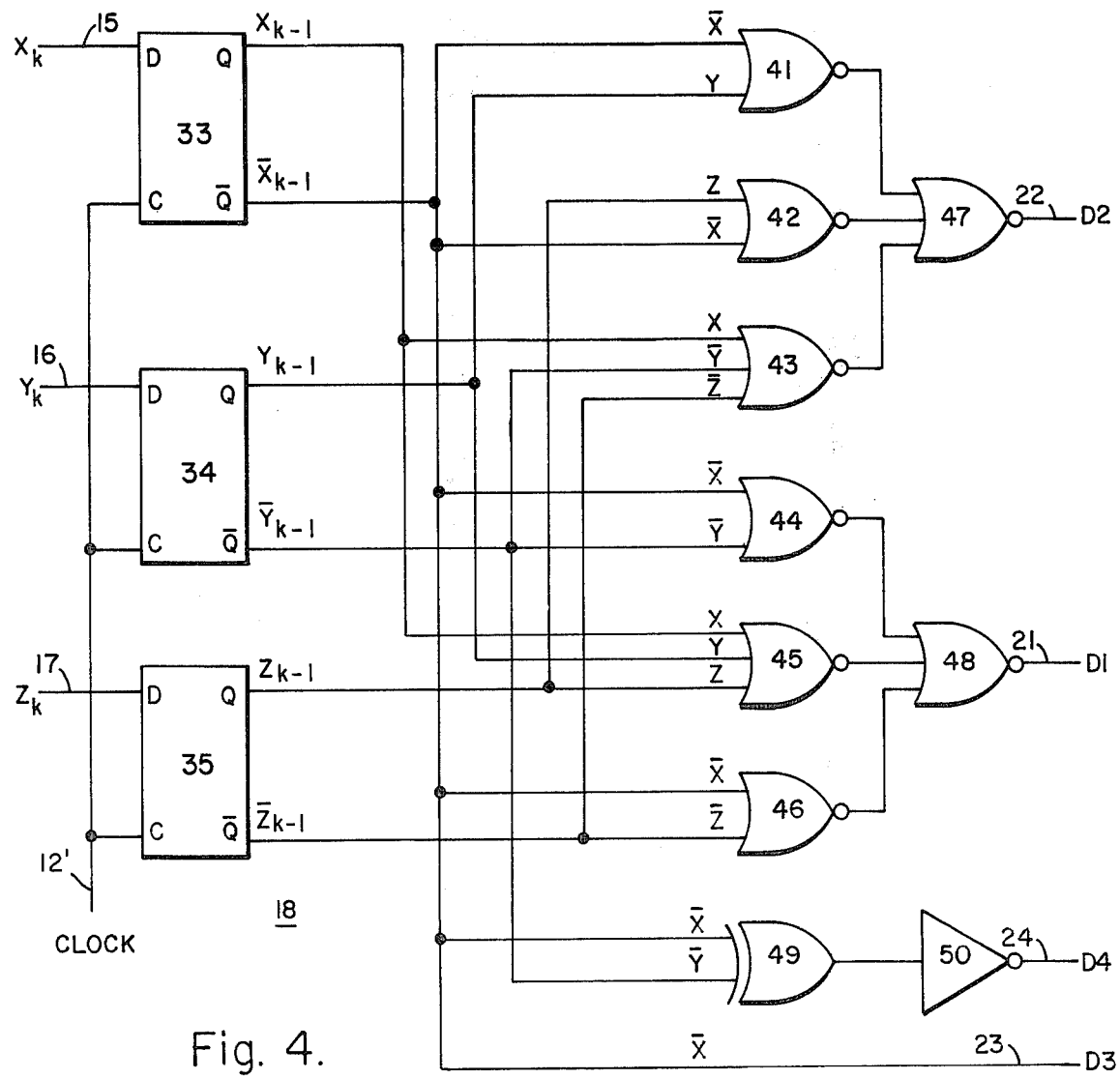
FIG. 2 is a tabulation describing the operation of the modulation system in FIG. 1 for selectively generating phasors of an 8-phase signal set.
FIG. 4 is a schematic diagram of the logic circuit 18 in FIG. 1.

A logic circuit 18 for coding tribits XYZ in accordance to the plan specified in FIG. 2 is illustrated in FIG. 4. It comprises three flip flops 33, 34, and 35, NOR gates 41–48, an exclusive-OR gate 49, and an inverter 50. The D-flip flops 33–35 convert a tribit sample in one symbol interval (k) into original and inverted representations thereof in a subsequent symbol interval (k−1). The gates 41–49 and inverter 50 logically combine and process the flip flop outputs to produce binary control signals D1–D4 according to the plan specified in FIG. 2.

Again referring to the structure of generator 10 in FIG. 1, the source 20 produces a sinusoidal signal S1=A/0° on line 25 having a constant frequency of 70kHz, a constant amplitude A, and a constant reference phase of 0°, for example. The signal S1 is delayed 45° by phase shifter 28 to produce a signal S2=A/−45° on line 29. The generator 26A is responsive to the signal S1 for producing the vector signal S7 which generates a 4-phase signal set with phasors at −a45° where a=1, 3, 5, and 7, in FIG. 3. The generator 26B is responsive to the phase shifted signal S2=A/−45° on line 29 for producing the vector signal S8 which generates a 4-phase signal set with phasors at −b45°, where b=0, 2, 4, and 6, in FIG. 3. The vector summer 30 combines the vector signals S7 and S8 in the manner indicated in FIG. 3 and described more fully hereinafter to produce the resultant vector signal S9 which generates an 8-phase signal set with phasors at −c22.5°, where c=1, 3, ... and 15.

Since the 4-phase generators 26A and 26B are structurally the same, only generator 26A will be described in detail. The generator 26A comprises a 90° phase splitter 53A, a pair of mixers 57A and 58A, and a vector summer 65A. The circuit 53A splits the signal S1=A/0° into quadrature phase signals S3 and S4 of the same amplitude B and the same frequency on lines 54A and 55A. The circuit 57A is a phase inverter type mixer which is responsive to the logic value of an associated binary control signal D1 for passing the input signal S3 on line 61A with either a 180° phase shift or no phase shift. It may be a double balanced mixer of the type shown in FIG. 5, which is a Zay series, type DBMX, double-balanced mixer manufactured by Mini-Circuits of Brooklyn, New York. The other mixers 57B, 58A and 58B are preferably the same type circuits.

The mixer in FIG. 5 comprises input and output transformers 71 and 73, and a diode quad 75. The control signal D1 is connected on line 77 to the center tap of transformer 73. When the binary signal D1 is a logic 0, for example, diodes 75c and 75d are cut off and the diodes 75a and 75b conduct so that a DC current flows away from the center tap on the secondary of transformer 71, through diodes 75a and 75b and the primary windings of transformer 73, and on line 77 in the direction of the arrow. This causes the AC signal S3' developed on the secondary winding of output transformer 73 to be 180° out-of-phase with the associated AC input signal S3 on the primary winding of input transformer 71. Conversely, the mixer 57A passes the input signal S3 on line 54A without a phase shift when the control signal D1 is a logic 1.

Assuming that the circuit 57A in FIG. 1 is lossless, it selectively produces vector signals S3=B/0° and S3'=B/−180° on line 61A when the control signal D1 is a logic 1 and logic 0, respectively. The mixer circuit 58A operates on an input signal S4=B/−90° in a similar manner for selectively producing vector signals S4=B/−90° and S4'=B/−270° on line 62A when the control signal D2 is a logic 1 and a logic 0, respectively. The vector signals S3, S3' and S4, S4' are represented by solid lined arrows along ones of the horizontal and vertical axes in FIG. 3. These signals are quadrature phase signals in that the phase difference between them is 90°.

The vector summer 65A is responsive to the equal amplitude vector signals from associated mixers 57A and 58A for producing the vector signal S7 on line 67A which generates the 4-phase signal set with phasors at −45°, −135°, −225°, and −315°. The operation of circuit 65A is illustrated graphically in FIG. 3 for combining a vector 81 which is the signal S3=B/0° on line 61A with a vector 83 which is the signal S4'=B/−270° on line 62A to produce the vector 85 which is the phasor S7=C/−315° on line 67A (see FIG. 2, row 1, columns 2–6). The circuit 65A may be a 2-way combiner-divider of the type illustrated in FIG. 6 which is manufactured by Anzac Electronics, a division of Adams-Russell in Waltham, Massachusetts. The circuits 30 and 65B may be the same devices. Alternatively, the circuits 30, 65A and 65B may be replaced by a single 4-way combiner 30' illustrated in FIG. 7 and manufactured by Anzac Electronics.

Briefly considering the operation of the other 4-phase generator 26B, the phase splitter 53B splits the phase shifted input signal S2=A/−45° into in-phase and quadrature-phase signals S5 and S6 on lines 54B and 55B. All of the signals S3, S4, S5 and S6 have the same amplitudes and frequencies. The mixers 57B and 58B are driven by associated binary signals D3 and D4 to produce the vector signals indicated on lines 61B and 62B in FIG. 1. The signals designated by primed and unprimed reference symbols there are 180° out-of-phase and in-phase with respect to those of input signals to associated mixers when the binary control signals D3 and D4 are logic 0 and 1, respectively. The vectors S5, S5' and S6, S6' on lines 61B and 62B are represented by phantom lined arrows along axes at ±45° with respect to the horizontal axis in FIG. 2. Reference to the definitions of vectors from the four mixers in FIG. 1 and graphic representations thereof in FIG. 3 reveals that vectors on lines 61B and 62B are shifted 45° with respect to vectors on associated lines 61A and 62A of the other 4-phase generator 26A, although all of these signals have the same amplitudes and frequencies. The circuit 65B combines the vector signals from mixers 57B and 58B for producing the vector signal S8 on line 67B which generates the second 4-phase signal set having phasors at 0°, −90°, −180°, and −270°, in FIG. 3. The two 4-phase signal sets produced on lines 67A and 67B are, of course, offset from each other by 45°. The operation of circuit 65B is illustrated graphically in FIG. 3 for combining a vector 87 (S5=B/−45°) with a vector 89 (S6'=B/−315°) for producing a vector 91 which is the phasor S8=C/0° on line 67B (see FIG. 2, row 1, columns 7-11).

The circuit 30 vectorially combines the equal amplitude vector signals S7 and S8 to produce the vector signal S9=D/−c22.5°, where c is odd, on line 69. The signal S9 takes on any one of eight different phases which are a function of the phases of the input signals S7 and S8 to circuit 30. The operation of the summer 30 is also illustrated graphically in FIG. 3 for combining a particular vector signal 85 (S7=C/−315°) with a particular vector signal 91 (S8=C/0°) for producing a particular resultant vector 93 which is the phasor S9=D/−337.5°=D/+22.5° (see also FIG. 2, row 1). By correctly selecting logic values of the control signals D1-D4 in the manner described above in relation to FIGS. 2 and 4, for example, the generators 26A and 26B are caused to produce vectors of particular phases on lines 61A, 61B, 62A and 62B so as to cause the vector signal S9 to generate the 8-different phasors at odd multiples of 22.5°, along the dashed lines in FIG. 3. This operation of generator 10 in producing a vector signal S9 selectively having phases $\phi_R$ is tabulated in FIG. 2 as a function of prescribed logic values of the control signals D1-D4 and the phases of associated vector signals S7 and S8. In this manner, the signal S9 individually generates the 8-phasors of the 8-phase signal set, rather than producing all of them simultaneously.

Although this invention is described in relation to preferred embodiments thereof, variations and modifications will be obvious to those skilled in the art. By way of example, differential encoding of tribits may be employed in a communication system including the 8-phase generator 10. It is only necessary then to modify the circuit 18 so that control signals D1-D4 are then a function of the sum or difference between tribits in adjacent symbol intervals. Also, the phase shifter 28 and the phase splitter of each 4-phase generator may produce signals on output lines such as lines 29, 54A and 55A which are different from the phases of applied signals by multiples of x45°, m90°, and n90°, respectively, (where x is odd, m is even and n is odd) for x and n being other than unity and m being other than 0. And each mixer may pass carrier input signals with other than either p360° or q180° phase shifts, where p and q are even and odd and are other than 0 and unity as in the examples described above. Further, the combining circuits and mixers may comprise circuitry other than that indicated here. The scope of this invention is therefore defined by the attached claims rather than the aforementioned detailed description of preferred embodiments thereof.

What is claimed is:

1. Apparatus for selectively individually producing phasors of an 8-phase signal set for use in a phase modulated digital communication system, comprising:
   first means producing a group of binary control signals D1, D2, D3, and D4 selectively having different prescribed combinations of logic values;
   second means producing a first carrier signal having a constant amplitude, a given frequency, and a prescribed constant reference phase;
   third means responsive to a first pair D1 and D2 of the control signals and to the first carrier signal for selectively producing a first pair of quadrature phase vector signals of the same amplitude and frequency and each selectively having a phase which may vary by 180° as a function of the logic value of an associated one of the signals D1 and D2, said first pair of vector signals together individually defining the phasors of a 4-phase signal set as the signals D1 and D2 assume different logic values;
   fourth means responsive to a second pair D3 and D4 of the control signals and to the first carrier signal for selectively producing a second pair of quadrature phase vector signals of the same amplitude and frequency as the first pair of vector signals and each selectively having a phase which may vary by 180° as a function of the logic value of an associated one of the signals D3 and D4, said second pair of vector signals individually defining the phasors of a second 4-phase signal set which is shifted in phase by x45°, where x is odd, with respect to the first signal set as the signals D3 and D4 assume different logic values; and
   fifth means combining the first and second pairs of constant amplitude vector signals for producing a resultant vector signal which individually generates the phasors of the 8-phase signal set as phases of vector signals of the two pairs thereof assume different values.

2. Apparatus responsive to tribits of data in a phase modulated digital communication system for selectively individually producing phasors of an 8-phase signal set, comprising:
   first means responsive to tribits of data having different prescribed combinations of logic values for producing associated groups of binary control signals D1, D2, D3 and D4 selectively having different combinations of logic values;
   second means producing a first carrier signal having a constant amplitude, a given frequency, and a prescribed constant reference phase;
   third means, which is a first 4-phase signal generator, responsive to a first pair D1 and D2 of control signals and to the first carrier signal for producing a first pair of quadrature phase vector signals of the same amplitude and frequency and each selectively having a phase which may vary by 180° as a function of logic values of an associated one of the signals D1 and D2; said first pair of vector signals together individually defining phasors of a first 4-phase signal set as the signals D1 and D2 assume different logic values;
   fourth means, which is a second 4-phase signal generator, responsive to a second pair D3 and D4 of control signals and to the first carrier signal for producing a second pair of quadrature phase vector signals of the same amplitude and frequency as the first pair of vector signals and each selectively having a phase which may vary by 180° as a function of the logic value of an associated one of the signals D3 and D4; vector signals of said second pair thereof together individually defining phasors of a second 4-phase signal set which is shifted in-phase by x45°, where x is odd, with respect to the first signal set as the signals D3 and D4 assume different logic values; and fifth means combining the first and second pairs of constant amplitude vector signals for producing a resultant vector signal which individually generates phasors of the 8-phase signal set as the control signals and thus the phases of the first and second pairs of vector signals assume different values.

3. Apparatus according to claim 2 wherein said fourth means comprises sixth means for shifting the phase of the first carrier signal by x45°, where x is odd, to produce a second carrier signal for causing the first and second 4-phase signal sets to operate x45° out-of-phase with respect to each other.

4. Apparatus according to claim 3 where x=1.

5. Apparatus according to claim 4 wherein:
said third means comprises seventh means splitting the first carrier signal into a third pair of equal amplitude quadrature phase vector signals, the phases of the vectors of the third pair thereof differing from the reference phase by m90° and n90°, respectively, where m is even and n is odd; and
said fourth means further comprises eighth means for splitting the second carrier signal into a fourth pair of quadrature phase vector signals having the same amplitudes and frequencies as the third pair thereof, the phases of the vector signals of the fourth pair thereof differing from the sum of the reference phase and the 45° phase shift by m90° and n90°, respectively, where m is even and n is odd;

6. Apparatus according to claim 5 wherein m=0 and n=1.

7. Apparatus according to claim 6 wherein each of said third and fourth means further comprises a pair of mixers, each mixer being responsive to an associated control signal for adjusting the phase of a different associated one of the vector signals of the third and fourth pairs thereof by p180° or q180°, where p is even and q is odd, in response to the logic value of the associated control signal for producing an associated one of the vector signals of one of the first and second pairs thereof.

8. Apparatus according to claim 7 wherein p=0 and q=1.

9. Apparatus according to claim 8 wherein each of said mixers is a phase inverter type double balanced mixer.

10. The method of selectively individually generating phasors of an 8-phase signal set which are representative of tribits of data in a phase modulated digital communication system, comprising the steps of:
producing a group of binary control signals D1, D2, D3 and D4 selectively having prescribed different combinations of logic values as a function of logic values of tribits of data;
producing a first carrier signal having a constant amplitude, a given frequency, and a prescribed constant reference phase;
shifting the phase of the first carrier signal by x45°, where x is odd, to produce a second carrier signal;
converting the first carrier signal into a first pair of equal amplitude quadrature phase vector signals having phases which differ from the reference phase by m90° and n90°, where m is even and n is odd;
converting the second carrier signal into a second pair of quadrature phase vector signals having the same amplitude as the vector signals of the first pair thereof and having phases which differ from the phase of the second carrier signal by m90° and n90°, where m is even and n is odd;
shifting the phase of each vector signal of the first and second pairs thereof by either m180° or n180°, where m is even and n is odd, in response to the logic value of an associated one of the binary control signals D1-D4 for producing a group of 4-each vector signals, one pair of vector signals of the group defining phasors of a first 4-phase signal set, the other pair of vector signals of the group defining phasors of a second 4-phase signal set operating x45° out-of-phase with respect to the first 4-phase signal set; and
combining said group of vector signals for producing a resultant vector signal which individually generates phasors of the 8-phase signal set as the binary control signals assume different logic values.

11. The method according to claim 10 wherein m=0, n=1, and x=1.

* * * * *